Oct. 4, 1938.    G. W. RAIZISS ET AL    2,131,817
POWDER INSUFFLATOR
Filed June 10, 1936    2 Sheets-Sheet 1

Inventors:
George W. Raiziss and
Herman Brahin.
By: Fisher, Clapp, Soans & Pond  Attys.

Oct. 4, 1938.  G. W. RAIZISS ET AL  2,131,817
POWDER INSUFFLATOR
Filed June 10, 1936   2 Sheets-Sheet 2
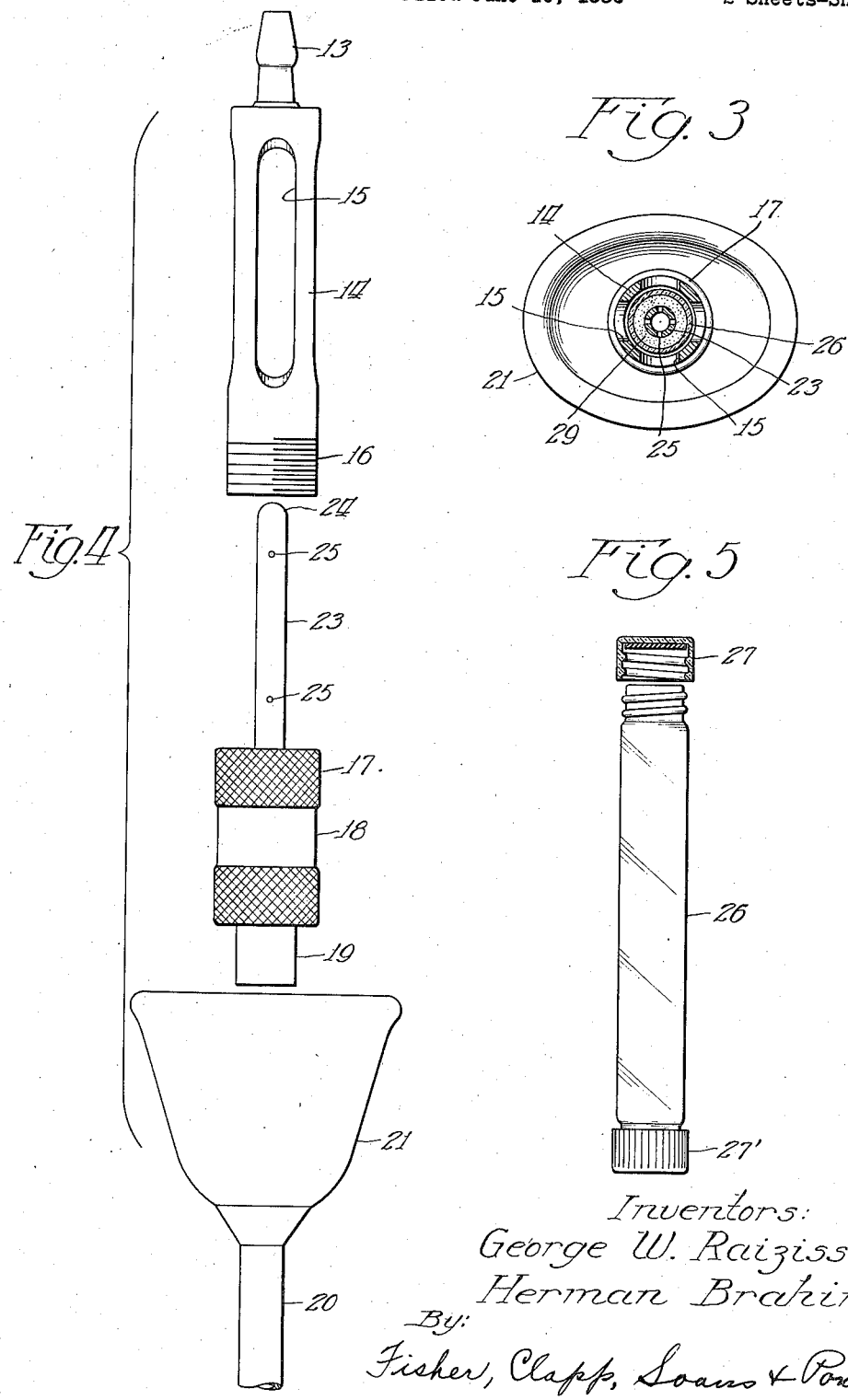

Patented Oct. 4, 1938

2,131,817

UNITED STATES PATENT OFFICE 2,131,817

POWDER INSUFFLATOR

George W. Raiziss and Herman Brahin, Philadelphia, Pa., assignors to Abbott Laboratories, North Chicago, Ill., a corporation of Illinois Application June 10, 1936, Serial No. 84,442

2 Claims. (Cl. 128—266)

This invention relates to powder insufflators and more particularly to a device for spraying medicinal powder into the vagina.

The powder insufflators heretofore available have not been found entirely satisfactory. For example, prior devices have been for the most part complex in structure making effective sterilization of the same after use extremely difficult. Other disadvantages inherent in insufflators heretofore available were due to the presence of parts easily broken and parts frequently out of order. Many of the prior devices were also found to be faulty in that they failed to provide an effective distribution of the medicinal powder.

It is an object of our invention to provide a simple, durable spraying device insuring a gradual and even distribution of powder.

It is also an object of our invention to provide an insufflator that is readily taken apart for effective cleansing and sterilizing.

Another object of our invention is to provide a substantially unbreakable insufflator having parts thereof that do not easily get out of order.

A further object of our invention is to provide a spraying device capable of using a powder ampule making it unnecessary to transfer the powder therefrom to the device and in which the powder level is visible to the operator.

Other objects will be apparent as the description hereinafter proceeds.

In the accompanying drawings forming a part of this specification,

Fig. 3 is a transverse sectional view along lines 3—3 of Fig. 2;

Fig. 4 is an enlarged exploded view of a portion of our insufflator shown in Fig. 1, illustrating particularly the method of assembly thereof; and Fig. 5 is an enlarged detailed view of the ampule included in our insufflator shown in Fig. 2.

Figure 1:
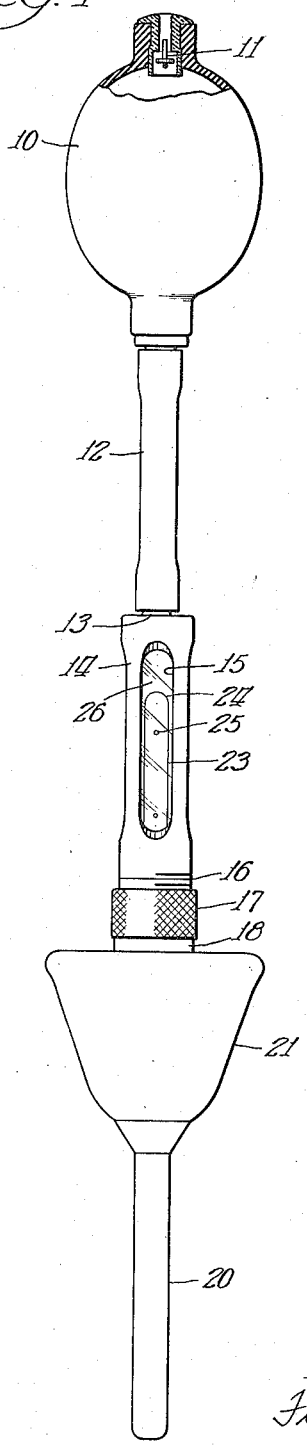
Fig. 1 is a side elevation partly in section of our powder insufflator.

Referring with more particularity to the drawings, the insufflator comprises means for forcing air, such as the conventional resilient air bulb 10 having one-way valve 11 and connecting tube 12. The connecting tube is attached to a nipple 13 on the upper end wall of a hollow cylinder or cage 14 which is provided with longitudinal elongated slots 15. The hollow cylinder is adapted to receive an ampule or powder container 26. The lower portion of the cage is threaded at 16 so as to be separably connected to the upper end 17 of an elongated cap 18. A small passageway extends through the lower reduced end 19 of the cap which latter is detachably secured to a discharge nozzle 20 provided with a guard 21.

The end wall of cap 18 has a central tapped hole to receive the lower threaded end 22 of a hollow projecting tube 23. The projecting tube is closed at upper end 24 and is open at the lower threaded end and is provided with multiple small lateral holes 25.

The ampule or powder container 26 (Fig. 5) is open at both ends and may be provided with threaded ends to engage screw caps 27 and 27', or may be provided with other conventional stoppers.

Figure 2:
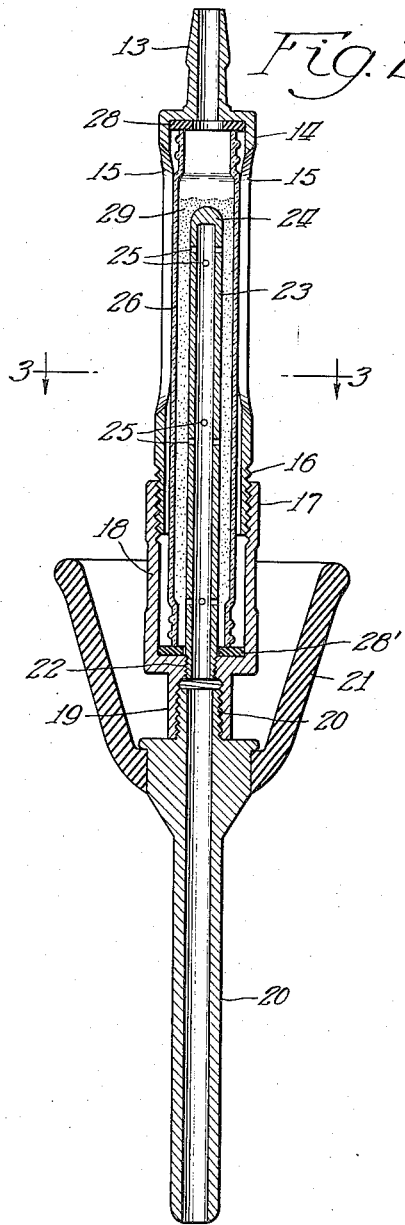
Fig. 2 is an enlarged longitudinal sectional view with the bulb removed of our insufflator shown in Fig. 1.

In the preferred operation of our insufflator one cap or stopper is removed from the ampule containing the powder. The ampule is placed into the cage with the open end foremost and seated on the end wall of the cage. The other cap or stopper is next removed and the cap is so positioned that the projecting tube is inserted into the ampule with the end wall of the cap seating on and closing the other end of the ampule, and the cap is then screwed hard up on the cage. The apparatus is then assembled as shown in Fig. 1. By means of compressible washers 28 and 28' (Fig. 2) at each end of the ampule air tight joints are obtained. It will readily be seen that by proper tilting of the apparatus during loading loss of powder can be easily avoided. The position of powder 29 in the assembled device is clearly shown in Fig. 2.

The air pressure supplied by compressing the bulb in the conventional manner forces the powder 29 in ampule 26 through holes 25 into the hollow projecting tube 23. From the projecting tube the powder passes downwardly through the lower end 19 of cap 18 and out through nozzle 20.

The air bulb and connecting tube of our insufflator are made of resilient material such as rubber or rubber substitute. The body of our spraying device is preferably made of non-corrosive metal. This insures a durable device unbreakable in ordinary use. The guard or seal 21 for the nozzle 20 may be made either of metal or rubber as desired. The ampule is preferably made of glass or other transparent material which is unaffected by contact with the medicinal powder.

Our improved simplified insufflator with its separably connected parts is easily taken apart after use insuring effective cleansing and sterilizing. The internal parts may be changed or replaced in the introduction of various antiseptic powders. This procedure is of particular importance as it aids in keeping different type powders free from self contamination. The use of the slotted cage 14 with the transparent ampule 26 by which the powder level is made visible to the operator has been found advantageous. The elimination of the necessity of transferring the powder from the ampule into the device simplifies the loading procedure and insures the sterile condition of the powder.

We have found that the narrow projecting tube 23 with the small lateral holes or perforations, that is inserted into the ampule with the powder, prevents the powder from being blown out all at once and insures a gradual, slow, even distribution of a fine stream of pulverized powder in spray form all over the interior of the vagina.

While we have illustrated our invention showing certain preferred embodiments thereof, it will be understood that our invention is not necessarily limited thereto. All modifications coming within the true spirit and scope of our invention are intended to be covered by the claims appended hereto.

We claim:

1. In a separable powder insufflator of the class described, the combination of a hollow cylinder having an end wall, a central external nipple on said end wall, and an annular seat on the inner side of said end wall encircling the bore of said nipple, the other end of said cylinder being open; an elongated cap having a screw thread connection with the open end of said cylinder and forming a longitudinal extension of the latter, said cap having an end wall formed with a central hole, and an annular seat on the inner side of said last named end wall encircling said hole, a powder ampule housed within said cylinder and cap, said ampule formed with open ends forced into snug contact with said annular seats by screwing said cap inwardly of said cylinder, a tube mounted in said hole and projecting into said ampule, said tube having holes in its walls, an air forcing device connected to said nipple, and a discharge nozzle secured to the end wall of said cap with its bore in line with the bore of said tube.

2. In a separable powder insufflator of the class described, the combination of a hollow cylinder having a longitudinal sight slot in its longitudinal wall, an end wall, a central external nipple on said end wall, and an annular compressible seat on the inner side of said end wall encircling the bore of said nipple, the other end of said cylinder being open; an elongated cap screwed onto the open end of said cylinder and forming a longitudinal extension of the latter, said cap having an end wall formed with a central tapped hole and an annular compressible seat on the inner side of said last named end wall encircling said hole, a glass ampule for containing powder housed within said cylinder and cap, said ampule formed with open ends forced into air tight contact with said compressible seats by screwing said cap hard onto said cylinder, a tube at one end screwed into said tapped hole and projecting into said ampule approximately the full length of the latter, said tube having a closed free end and holes in its side walls, an air forcing device connected to said nipple, and a discharge nozzle detachably secured to the end wall of said cap with its bore in line with the bore of said tube.

GEORGE W. RAIZISS.
HERMAN BRAHIN.